J. M. LANDES.
Cultivator.
No. 106,837.  Patented Aug. 30, 1870.
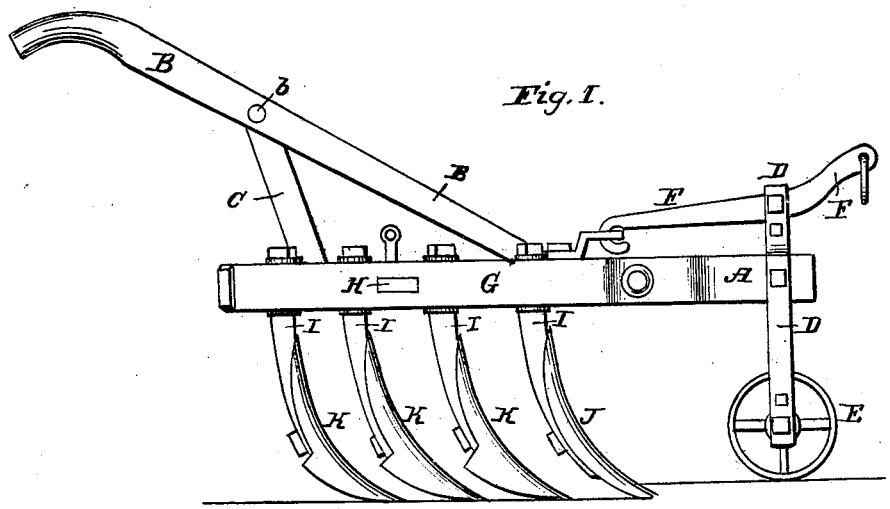
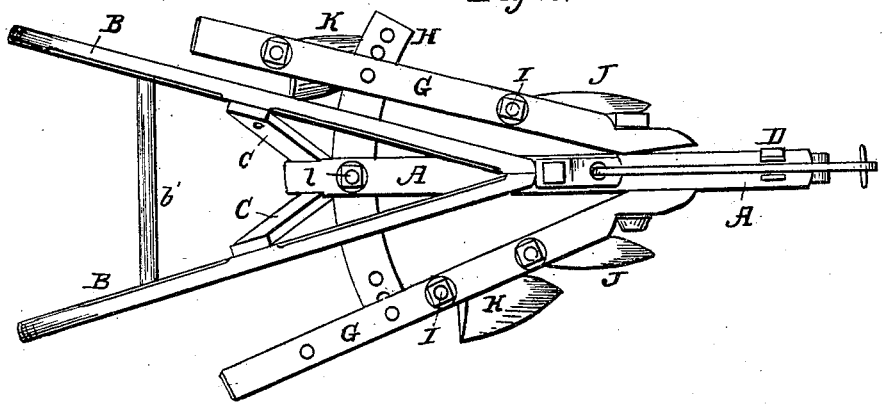
Witnesses:
S. S. Mabee
Alex. F. Roberts
Inventor:
J. M. Landes
per Munn & Co.
Att'ys.

UNITED STATES PATENT OFFICE.

JACOB M. LANDES, OF SOUDERS, PENNSYLVANIA.

IMPROVEMENT IN COMBINED PLOW AND CULTIVATOR.

Specification forming part of Letters Patent No. 106,837, dated August 30, 1870.

*To all whom it may concern:*

Be it known that I, JACOB M. LANDES, of Souders, in the county of Montgomery and State of Pennsylvania, have invented a new and useful Improvement in Combined Plow and Cultivator; and I do hereby declare that the following is a full, clear, and exact description thereof, which will enable others skilled in the art to make and use the same, reference being had to the accompanying drawing, forming a part of this specification, in which—

Figure 1 is a side view of my improved machine adjusted as a corn-plow. Fig. 2 is a top view of the same.

My invention relates to combined plows and cultivators; and consists in an improved arrangement of parts to simultaneously adjust the depth and corresponding line of draft, which will be first described in connection with all that is necessary to a full understanding thereof, and then clearly specified in the claim.

A is the main or central beam of the cultivator, to the middle part of which are attached the lower or forward ends of the handles B, the rear or upper parts of which are connected by a round, $b'$, and are supported and held in their proper relative positions by the braces C.

To the forward end of the beam A is attached a vertical standard, D, to the lower end of which is pivoted the gage E, several holes being formed in said standard to receive the axle of the said wheel, so that it may be raised or lowered to adjust the plows to run deeper or shallower in the ground, as may be desired.

F is the draft-bar, upon the rear end of which is formed a hook to hook into an eye-strap attached to the beam A.

The draft-bar F is bolted to the upper ends of the standard D, which project above the beam A, and in which are formed several holes for the reception of the said bolt, so that the line of draft may be adjusted as desired.

G are the side beams, the forward ends of which are secured to the sides of the forward part of the beam A by a bolt, which passes through the said beam A and through elongated holes in the forward ends of the said side beams G, so that the rear ends of the said side beams may be moved outward or inward to expand or contract the cultivator, as may be desired.

To the rear end of the main beam A is attached the center of the curved bar H, the ends of which pass through slots in the side beams G, and to which the said side beams are secured by pins passing through holes in the side beams G and through one or other of the holes in the end parts of the curved bar H, so as to secure the said beams in position when adjusted.

I are the plow-standards, the upper ends of which pass up through holes in the plow-beams A G, and are secured by washers and nuts placed upon their upper ends.

The two forward standards I are attached to the forward parts of the side beams G. The central standard is attached to the rear part of the beam A. The left-hand rear standard is attached to the rear end of the left-hand side beam, and the right-hand rear standard has two holes formed for its reception in the right-hand side beam, one in the middle part of said beam, in which the said standard is placed when the machine is adjusted as a corn-plow, and one in the rear end of said beam, in which the said standard is placed when the machine is adjusted as a cultivator.

To the two forward standards I are attached the double cultivator teeth or plates J, both ends of which are exactly alike, so that when one end becomes worn the said teeth may be detached and reversed.

To the rear standards I are attached the plows K, which are also made double, one end being formed with a wing to turn a furrow, which ends are used when the machine is used as a corn-plow.

The other ends of the plows K are made similar to the ends of the teeth J, and are designed to be used when the machine is used as a cultivator.

The teeth J and plows K are secured to the standards I by bolts which pass through the centers of said teeth J and plows K, and through the lower parts of the standards I, and are secured in place by nuts, as shown in Fig. 1.

Having thus described my invention, what I claim as new, and desire to secure by Letters Patent, is—

The reversible plows J K, standards I D, draft-bar F, and beams A G G, all constructed and relatively arranged as and for the purpose described.

JACOB M. LANDES.

Witnesses:
CHARLES FREDERICK,
WILLIAM B. LANDES.